US012291030B2

(12) United States Patent
Maruyama et al.

(10) Patent No.: US 12,291,030 B2
(45) Date of Patent: May 6, 2025

(54) RECORDING DEVICE AND RECORDING METHOD FOR DISCHARGING INK AND REACTION LIQUID

(71) Applicant: SEIKO EPSON CORPORATION, Tokyo (JP)

(72) Inventors: Naoki Maruyama, Nagano (JP); Ippei Okuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 18/163,309

(22) Filed: Feb. 2, 2023

(65) Prior Publication Data

US 2023/0249452 A1 Aug. 10, 2023

(30) Foreign Application Priority Data

Feb. 4, 2022 (JP) ................................ 2022-016162

(51) Int. Cl.
*B41J 2/045* (2006.01)
*B41J 2/135* (2006.01)
*B41J 2/17* (2006.01)

(52) U.S. Cl.
CPC ......... *B41J 2/0456* (2013.01); *B41J 2/04541* (2013.01); *B41J 2/135* (2013.01); *B41J 2/17* (2013.01)

(58) Field of Classification Search
CPC ...... B41J 2/0456; B41J 2/04541; B41J 2/135; B41J 2/17; B41J 2/2114; B41J 2/2132
See application file for complete search history.

(56) References Cited

U.S. PATENT DOCUMENTS

2006/0262160 A1* 11/2006 Hara ...................... B41J 2/2114 347/43
2007/0019015 A1* 1/2007 Tatsumi ................. B41J 2/2114 347/12
2016/0251532 A1 9/2016 Yano et al.

FOREIGN PATENT DOCUMENTS

JP 2016-163986 A 9/2016

* cited by examiner

*Primary Examiner* — Bradley W Thies
(74) *Attorney, Agent, or Firm* — Global IP Counselors, LLP

(57) ABSTRACT

A recording device includes: a first nozzle group including a plurality of nozzles configured to discharge, to a medium, a first dot that is a dot of a reaction liquid; a second nozzle group including a plurality of nozzles configured to discharge, to the medium to which the reaction liquid is discharged, a second dot that is a dot of ink containing a color material that coagulates with the reaction liquid; and a control unit configured to control discharging of the first dot by the first nozzle group and discharging of the second dot by the second nozzle group, in which the control unit controls arrangement, on the medium, of the first dot discharged by the first nozzle group so as to be more regular than arrangement, on the medium, of the second dot discharged by the second nozzle group.

5 Claims, 7 Drawing Sheets

RECORDING DEVICE AND RECORDING METHOD FOR DISCHARGING INK AND REACTION LIQUID

The present application is based on, and claims priority from JP Application Serial Number 2022-016162, filed on Feb. 4, 2022, the disclosure of which is hereby incorporated by reference herein in its entirety.

BACKGROUND

1. Technical Field

The present disclosure relates to a recording device and a recording method.

2. Related Art

There is disclosed an ink-jet recording method that includes a step of attaching, to a recording medium, a reaction liquid that causes a component of coloring ink containing a color material to coagulate or increases the viscosity of the component, and also includes a step of causing the coloring ink to be attached, through an ink jet method, in a region where the reaction liquid is attached (see JP-A-2016-163986).

In general, due to the effect of coagulation or fixing using the reaction liquid, the sense of granularity of dots of ink that has reacted with the reaction liquid is less likely to be noticeable, which makes it easy to obtain favorable image quality having high graininess.

However, when dots of the reaction liquid are irregularly arranged on the medium, positions where individual dots of the ink coagulate are also irregular on the medium, or the size of each dot of ink is nonuniform, which results in a deterioration in the graininess. In particular, in a case of a relatively bright image with a low gray-scale to intermediate tone, a deterioration in the graininess or a reduction in the chroma can be seen due to such irregularity or nonuniformity.

SUMMARY

A recording device includes a first nozzle group including a plurality of nozzles configured to discharge, to a medium, a first dot that is a dot of a reaction liquid, a second nozzle group including a plurality of nozzles configured to discharge, to the medium to which the reaction liquid is discharged, a second dot that is a dot of ink containing a color material that coagulates with the reaction liquid, and a control unit configured to control discharging of the first dot by the first nozzle group and discharging of the second dot by the second nozzle group, in which the control unit controls arrangement, on the medium, of the first dot discharged by the first nozzle group so as to be more regular than arrangement, on the medium, of the second dot discharged by the second nozzle group.

Provided is a recording method performed by a recording device including a first nozzle group including a plurality of nozzles configured to discharge, to a medium, a first dot that is a dot of a reaction liquid, and a second nozzle group including a plurality of nozzles configured to discharge, to the medium to which the reaction liquid is discharged, a second dot that is a dot of ink containing a color material that coagulates with the reaction liquid, the method including a recording step of controlling discharging of the first dot by the first nozzle group and discharging of the second dot by the second nozzle group, in which, in the recording step, arrangement, on the medium, of the first dot discharged by the first nozzle group is controlled to be more regular than arrangement, on the medium, of the second dot discharged by the second nozzle group.

DESCRIPTION OF EXEMPLARY EMBODIMENTS

Below, embodiment according to the present disclosure will be described with reference to the drawings. Note that each of the drawings is merely given as an example used to explain the present embodiment. Since each of the drawings is given as an example, the proportion or the shape thereof may not be precise or contradict to each other or a portion thereof may not be illustrated.

1. Description of Outline of Device Configuration

Figure 1:
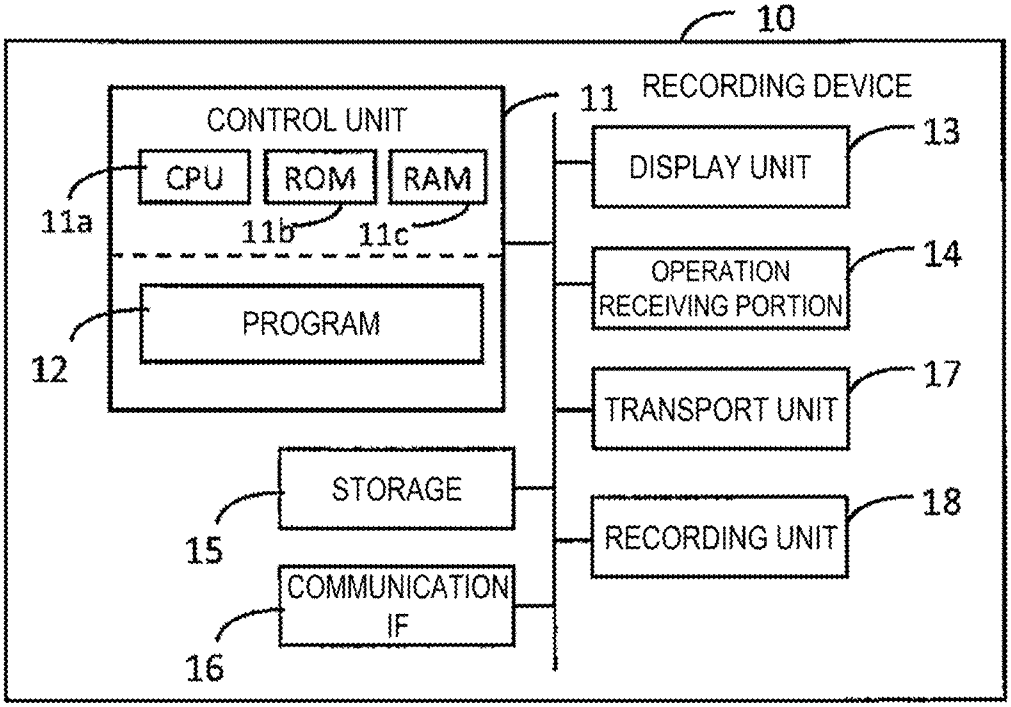
FIG. 1 is a block diagram schematically illustrating a device configuration according to the present embodiment.

FIG. 1 illustrates the configuration of a recording device 10 according to the present embodiment in a simplified manner. A recording method according to the present embodiment is performed by the recording device 10.

The recording device 10 includes a control unit 11, a display unit 13, an operation receiving portion 14, a storage 15, a communication IF 16, a transport unit 17, a recording unit 18, or the like. The "IF" stands for an interface. The control unit 11 is configured to include, as a processor, one or a plurality of ICs including a CPU 11*a*, a ROM 11*b*, a RAM 11*c*, and the like, other non-volatile memory, and the like. The control unit 11 is configured such that the processor, that is, the CPU 11*a* executes computation processing in accordance with a program 12 stored in the ROM 11*b* or other memories or the like by using the RAM 11*c* as a work area. The processor is not limited to the single CPU, and it may be possible to employ a configuration in which the processing is performed by a hardware circuit such as a plurality of CPUs, an ASIC, or the like, or employ a configuration in which the CPU and the hardware circuit work in concert to perform the processing.

The display unit 13 is a means configured to display visual information, and is configured, for example, by a liquid crystal display, an organic EL display, or the like. The display unit 13 may be configured to include a display and a driving circuit configured to drive the display. The operation receiving portion 14 is a means configured to receive input from a user, and is achieved, for example, by a physical button, a touch panel, a mouse, a keyboard, or the like. Of course, the touch panel may be achieved as one function of the display unit 13. It may be possible to call the display unit 13 and the operation receiving portion 14 an operating panel of the recording device 10. The display unit 13 and the operation receiving portion 14 may be part of the configuration of the recording device 10, or may be peripheral units externally coupled to the recording device 10.

The storage 15 is a storage means such as a hard disk drive, a solid state drive, or other memories, for example. It may be possible to regard a portion of the memory of the control unit 11 as the storage 15. It may be possible to regard the storage 15 as a portion of the control unit 11.

The communication IF 16 is a generic term of one or a plurality of IFs used to couple the recording device 10 with an external device in a wired or wireless manner in accordance with a predetermined communication protocol including a known communication standard. The external device includes, for example, a personal computer, a server, a smartphone, a communication device such as a tablet-type terminal.

The transport unit 17 is a means used to transport a medium 30 along a predetermined transport path under control by the control unit 11. The transport unit 17 includes, for example, a roller configured to rotate to transport the medium 30, a motor used to drive the roller, and the like. In addition, the transport unit 17 may be a mechanism configured such that the medium 30 is mounted on a belt or a pallet configured to move with a motor, to transport the medium 30. Typically, the medium 30 is a sheet. However, it is only necessary that the medium 30 is a medium that can be a target of recording, and the medium 30 may be made of a base material other than paper, and include a film, fabric, or the like.

The recording unit 18 is a means of an ink jet type configured to discharge a liquid such as ink from a nozzle 21 under control by the control unit 11 to perform recording on the medium 30, and includes a printing head 20 that will be described later. A droplet discharged from the nozzle 21 is referred to as a dot. The printing head 20 may be referred to as a liquid discharging head, a printing head, a letter printing head, an inkjet head, or the like.

The recording device 10 may be achieved by a single printer, or may be achieved by a system in which a plurality of devices are coupled in a manner that they can communicate with each other. For example, the recording device 10 may be a system including an information processing device serving as the control unit 11 and also including a printer including the transport unit 17 and the recording unit 18 to perform recording under control by the information processing device. In this case, it is possible to regard this information processing device as a recording control device, an image processing apparatus, or the like.

Figure 2:
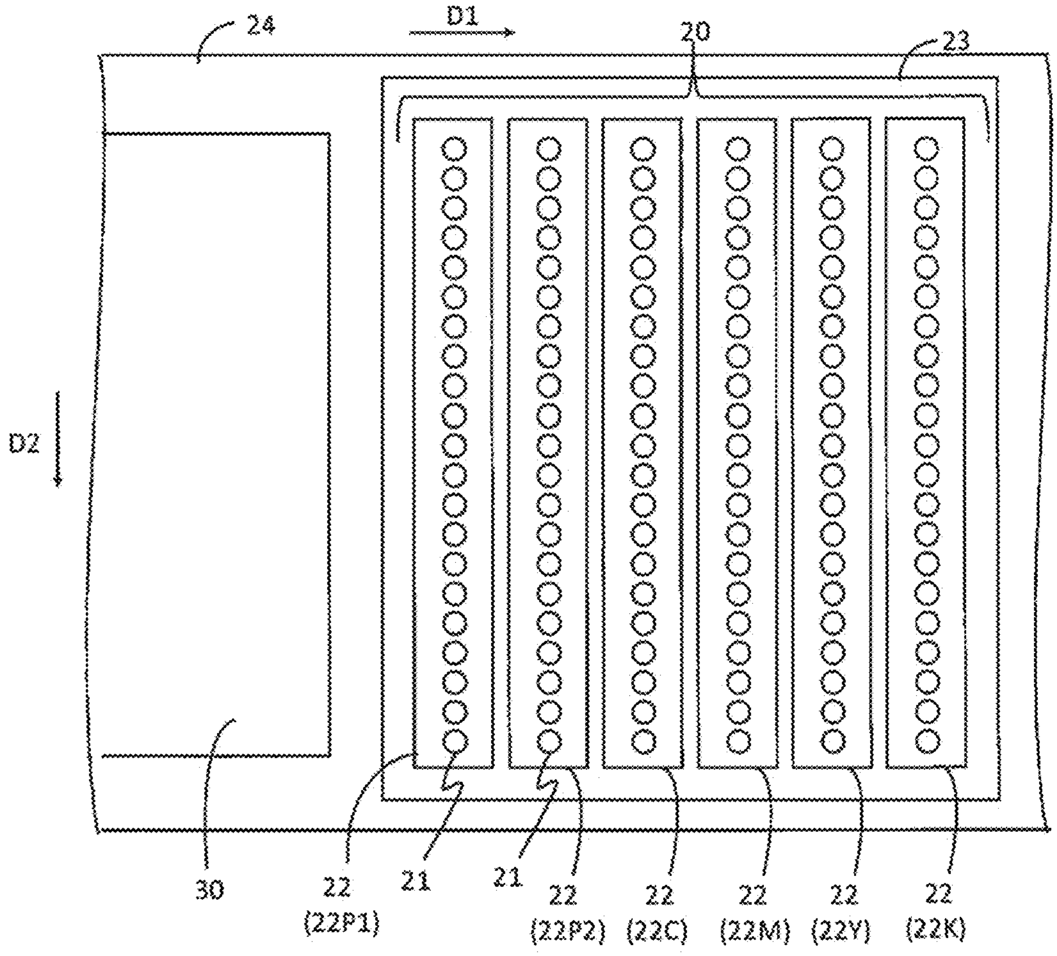
FIG. 2 is a diagram schematically illustrating a relationship between a medium and a printing head or the like as viewed from above.

FIG. 2 illustrates a relationship between the medium 30 and the printing head 20 or the like as viewed from above in a simplified manner. FIG. 2 illustrates two directions D1 and D2 intersecting at a right angle. The direction D1 is referred to as a transport direction D1 of the medium 30 by the transport unit 17, and the direction D2 is referred to as a width direction D2. The upstream and downstream in the transport direction D1 are also simply referred to as upstream and downstream, respectively. In the example in FIG. 2, the medium 30 is transported by the transport unit 17 from the upstream side to the downstream side on the platen 24. The platen 24 is a base configured to support the medium 30, and can be regarded as a portion of a transport path of the medium 30.

In FIG. 2, each of the circles represents each nozzle 21. The printing head 20 is configured to discharge dots of ink or the like from each of the nozzles 21 or stop discharging it on the basis of record data generated by the control unit 11 and used to record an image, thereby recording the image on the medium 30. As already known, at the printing head 20, a drive element (not illustrated) is provided for each of the nozzles 21, and application of a driving signal to the drive element is controlled on the basis of the record data, which makes it possible to select discharging (dot-on) and non-discharging (dot-off) of a dot for each of the nozzles 21. For example, the printing head 20 is able to discharge each color ink such as cyan (C) ink, magenta (M) ink, yellow (Y) ink, or black (K) ink, and also discharge a reaction liquid having a function of causing a color material contained in the ink, specifically, a pigment component to coagulate or fixing the color material. It is needless to say that the printing head 20 may be configured to discharge ink of a color other than the colors described above or other liquids.

The printing head 20 is configured so as to receive supply of a liquid such as ink from a liquid holding means (not illustrated) called an ink cartridge, an ink tank, or the like to discharge it from the nozzles 21, and includes separate nozzle groups 22 for each liquid. FIG. 2 illustrates one example of the array of the nozzles 21 in the printing head 20. A nozzle group 22P1 represents a nozzle group 22 including a plurality of nozzles 21 configured to discharge a first reaction liquid serving as one type of a reaction liquid. In addition, a nozzle group 22P2 represents a nozzle group 22 including a plurality of nozzles 21 configured to discharge a second reaction liquid serving as one type of reaction liquid and differing from the first reaction liquid. The nozzle group 22P1 and the nozzle group 22P2 each correspond to a "first nozzle group". For the first reaction liquid or the second reaction liquid, it can be considered to use, for example, a reaction liquid containing propionic acid Ca used for a film-based medium 30, or a reaction liquid containing nitric acid Ca used for a paper-based medium 30. However, in the present embodiment, it is not essential that the number of the types of the reaction liquid that the printing head 20 is able to discharge is two or more, and the number of types thereof may be one. A dot of the reaction liquid discharged by the nozzles 21 of the first nozzle group is referred to as a "first dot" or a "dot of the reaction liquid".

A nozzle group 22C represents a nozzle group 22 including a plurality of nozzles 21 that discharge the C ink. Similarly, a nozzle group 22M represents a nozzle group 22 including a plurality of nozzles 21 that discharge the M ink. A nozzle group 22Y represents a nozzle group 22 including a plurality of nozzles 21 that discharge the Y ink. A nozzle group 22K represents a nozzle group 22 including a plurality of nozzles 21 that discharge the K ink. The nozzle groups 22C, 22M, 22Y, and 22K each correspond to a "second nozzle group". A dot of ink discharged by the nozzles 21 of the second nozzle group is referred to as a "second dot" or an "ink dot". Thus, the control unit 11 is able to perform a "recording step" of controlling discharging of the first dot by the first nozzle group and discharging of the second dot by the second nozzle group.

In the example in FIG. 2, each of the nozzle groups 22 is including a plurality of nozzles 21 arranged over a region that can cover the width of a medium that corresponds to the length of the medium 30 in the width direction D2. The plurality of nozzle groups 22P1, 22P2, 22C, 22M, 22Y, and 22K are disposed at the same position in the width direction D2, and are arranged along the transport direction D1. In addition, the nozzle group 22P1 and the nozzle group 22P2, which are the first nozzle group, are disposed upstream of the nozzle groups 22C, 22M, 22Y, and 22K that are the second nozzle group. Thus, from the viewpoint of the position or the region where the medium 30 is located, the reaction liquid is first discharged, and then, ink of each of the colors is discharged.

One nozzle group 22 as a whole is formed by arranging the plurality of nozzles 21 at a constant or substantially constant nozzle pitch, which is a distance between nozzles 21 in the width direction D2. In FIG. 2, one nozzle group 22 is configured, in a simplified manner, as one nozzle row in which the plurality of nozzles 21 are arranged along the width direction D2. Needless to say, one nozzle group 22 may be including a plurality of nozzle rows, and a direction in which the nozzles 21 that form the nozzle group 22 are arranged is a direction oblique relative to the width direction D2. Furthermore, the nozzle group 22 may be referred to as a nozzle row 22 regardless of how the nozzles 21 that form the nozzle group 22 are arranged.

The printing head 20 is mounted at a carriage 23. That is, the recording unit 18 includes the printing head 20 and the carriage 23. With power received from a carriage motor (not illustrated), the carriage 23 is able to reciprocate in parallel to the transport direction D1 at a predetermined height at a position located higher than the platen 24. The printing head 20 moves in conjunction with the carriage 23.

In the example in FIG. 2, the control unit 11 causes the carriage 23 to move by a certain distance from the downstream side toward the upstream side in a state where the medium 30 is at rest on the platen 24. During a time when the carriage 23 is moving upstream, the control unit 11 causes a reaction liquid and ink to be discharged from each of the nozzle groups 22 of the printing head 20 to the medium 30, thereby performing single recording on the medium 30. After this, the control unit 11 causes the transport unit 17 to transport the medium 30 downstream by a distance corresponding to the single recording and also causes the carriage 23 to move downstream by a distance corresponding to the single recording. Then, the control unit 11 causes the printing head 20 to perform recording again in association with movement of the carriage 23 toward the upstream side. By repeating this, the control unit 11 is able to continuously perform recording on the medium 30.

In addition, it may be possible to employ a configuration in which, by using the carriage 23, the printing head 20 moves in a direction parallel to the transport direction D1 and in a direction parallel to the width direction D2, thereby performing recording on the medium 30.

Furthermore, it may be possible to employ a configuration in which the transport direction of the medium 30 by the transport unit 17 is set to a direction parallel to the width direction D2 in FIG. 2, and transporting of the medium 30 and movement of the printing head 20 by the carriage 23 parallel to the direction D1 are alternately repeated to perform recording.

It may be possible to employ a configuration in which the recording unit 18 does not include the carriage 23. In other words, it may be possible to employ a configuration in which, in the configuration in FIG. 2, the carriage 23 is omitted, the printing head 20 is fixed above the platen 24, and when the medium 30 being transported by the transport unit 17 passes through below the printing head 20 toward the downstream side, recording is performed with the reaction liquid and the ink discharged from the printing head 20.

In any cases, in the present embodiment, the printing head 20 first discharges the reaction liquid to the medium 30, and then, discharges the ink.

2. Recording Controlling Process

Figure 3:
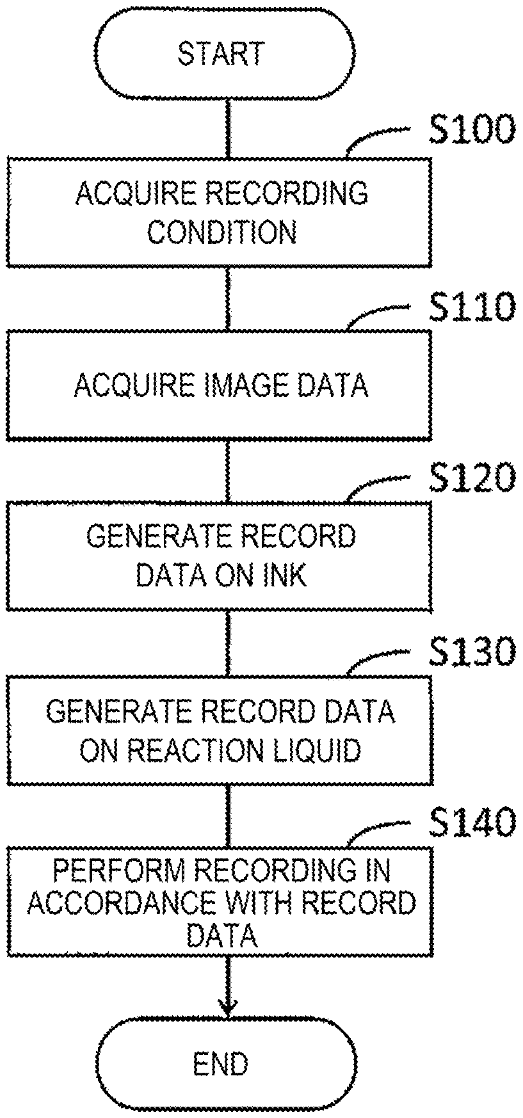
FIG. 3 is a flowchart illustrating a recording controlling process.

FIG. 3 illustrates a flowchart of a recording controlling process performed by the control unit 11 in accordance with the program 12. At least a portion of this flowchart corresponds to a recording method including the recording step.

In step S100, the control unit 11 acquires a recording condition used to record an image. A user operates the operation receiving portion 14 to designate the recording condition as appropriate. Thus, the control unit 11 is able to acquire, as the recording condition, a recording mode, a medium type, and other various types of settings concerning recording in accordance with input from the user. The medium type is, for example, information indicating a type such as a sheet, a film, or a fabric. In general, the recording mode includes a recording mode using the reaction liquid and a recording mode not using the reaction liquid. In the present embodiment, description will be made on the assumption that the recording mode using the reaction liquid is designated.

In step S110, the control unit 11 acquires image data representing an image serving as a recording target. A user selects image data as appropriate. Then, an instruction of the selected image data is given to the control unit 11, or the selected image data is transmitted from an external device to the recording device 10. The control unit 11 acquires the given image data from a memory in or outside the recording device 10, or acquires, through the communication IF 16, the image data transmitted from the external device. Step S100 and step S110 may be performed substantially at the same time, or step S110 may be first performed. In addition, the recording device 10 may receive, from the external device, image data accompanied by information on the recording condition, thereby performing steps S100 and S110.

Figure 4:
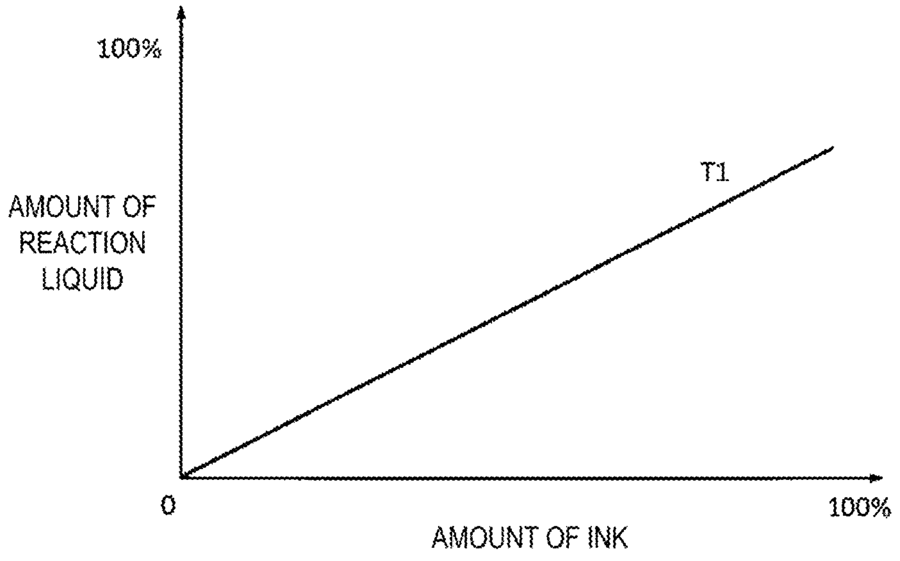
FIG. 4 is a diagram illustrating an example of a reaction-liquid amount table.

In steps S120 and S130, the control unit 11 generates record data used to perform recording by the recording unit 18, on the basis of the image data acquired in step S110. The record data generated in step S120 is "ink record data" used to discharge the ink. The record data generate in step S130 is "reaction-liquid record data" used to discharge the reaction liquid. In FIG. 4, steps S120 and S130 are shown as separate steps. However, it may be possible that these steps are not separated, and are regarded as one integrated process.

First, a method of generating ink record data through step S120 will be described briefly. The control unit 11 performs necessary color conversion processing depending on a format or color system of the image data to convert the image data into ink-amount image data including the amount of ink for each pixel. In a case of a configuration in which the printing head 20 uses CMYK ink as illustrated in FIG. 2, the amount of ink for each pixel means a gray-scale value of individual CMYK for each pixel. The gray-scale value is expressed, for example, as 256 gray-scale of 0 to 255. The gray-scale value indicating the amount of ink for each CMYK may be expressed by normalizing the value into the density of 0 to 100% for each CMYK.

When the image data is, for example, RGB image data having gray-scale values of red (R), green (G), and blue (B) for each pixel, it is only necessary that the control unit 11 looks up a color-conversion look-up table that defines in advance a correspondent relationship between RGB and CMYK, thereby performing color conversion. In addition, the control unit 11 applies halftone processing to the ink-amount image data using a dithering method to generate ink record data that defines dot-on or dot-off for each pixel and for each CMYK ink.

Next, a method of generating reaction-liquid record data through step S130 will be described. The control unit 11 determines the amount of reaction liquid discharged by the first nozzle group in accordance with the ink record data or the ink-amount image data before application of the halftone processing to the ink record data.

FIG. 4 illustrates one example of a reaction-liquid amount table T1. The reaction-liquid amount table T1 is stored in advance in the storage 15 or in an external recording medium that the control unit 11 is able to access. The reaction-liquid amount table T1 defines a relationship between the amount of ink and the amount of reaction liquid. In FIG. 4, the reaction-liquid amount table T1 shows linearity. However, the table may show non-linearity.

As can be understood from FIG. 4, the reaction-liquid amount table T1 defines the relationship between the amount of ink and the amount of reaction liquid such that the amount of reaction liquid increases with increase in the amount of ink. The amount of ink on the horizontal axis of the reaction-liquid amount table T1 indicates the amount of ink per certain area represented by the ink record data or the ink-amount image data. For example, when the number of pixels that constitute the certain area is multiplied by the number of ink colors and the thus obtained value is set as 100%, the amount of ink per certain area can be calculated as a ratio of the total number of dots of CMYK in this area. The number of dots represents the number of dot-on. Alternatively, when the number of pixels that constitute a certain area is multiplied by the number of 255×ink colors and the thus obtained value is set as 100%, the amount of ink per the certain area can be calculated as a ratio of the total CMYK gray-scale value before the halftone processing of all the pixels in this area. In addition, the amount of reaction liquid on the vertical axis of the reaction-liquid amount table T1 represents the necessary amount of reaction liquid per certain area. For example, when the number of pixels that constitute the certain area is set as 100%, the necessary amount of reaction liquid per certain area is a ratio of the number of dots of the reaction liquid.

It is only necessary that the control unit 11 looks up the reaction-liquid amount table T1 to determine the amount of reaction liquid in accordance with the amount of ink indicated by the ink record data or the ink-amount image data. For example, for each page represented by the image data, the control unit 11 determines the amount of reaction liquid in accordance with the amount of ink in the page. In this case, the area of one page corresponds to the certain area described above. Alternatively, the control unit 11 divides the inside of a page represented by the image data into the predetermined number of regions, and for each of the divided regions, determines the amount of reaction liquid in accordance with the amount of ink in the region. In this case, the area of a region corresponds to the certain area described above.

By regarding, as each region, each object in a page represented by the image data, the control unit 11 may determine, for each region, the amount of reaction liquid in accordance with the amount of ink within the region. With this configuration, it is possible to change the amount of reaction liquid according to the amount of ink for each region in a page, thereby optimizing the amount of reaction liquid for each region. The object means, for example, a region corresponding to a photograph image, a region corresponding to a graph, a region corresponding to a character string, or the like.

The control unit 11 performs the halftone processing to the amount of reaction liquid that is determined as described above, and generates the reaction-liquid record data that defines the dot-on or the dot-off of the reaction liquid for each pixel. At this time, the control unit 11 generates the reaction-liquid record data such that the arrangement of dots of the reaction liquid on the medium 30 is more regular than the arrangement of ink dots of the ink record data on the medium 30. The "arrangement of dots is regular" means a state in which there is regularity in the arrangement of dots, or a state in which distances between dots are closer to equal.

As described above, the dithering method is used for the halftone processing when the ink record data is generated in step S120. The dithering method is a method in which a dither matrix in which various threshold values are randomly distributed is applied to the ink-amount image data to convert the gray-scale value of each pixel into a binary value of dot-on or dot-off. For this reason, distances of dots generated are not uniform, and the arrangement of the dots is relatively irregular.

Thus, in step S130, the control unit 11 uses, for example, error diffusion in the halftone processing to the determined amount of reaction liquid. In the error diffusion, an error occurring as a result of comparison between the amount of reaction liquid and the threshold value per pixel is diffused to surrounding pixels, and at the surrounding pixels, comparison is made between the threshold value and the amount of reaction liquid that has been corrected using the diffused error. Thus, in the result of the halftone processing using the error diffusion, the arrangement of dots is more regular than that using the dithering method. Note that, in the error diffusion, by adjusting the way of diffusing the error to the surrounding pixels, it is possible to control the regularity of the generated dots.

It is only necessary that the control unit 11 generates the reaction-liquid record data such that the arrangement of dots of the reaction liquid is more regular than the arrangement of ink dots, and using the error diffusion to generate the reaction-liquid record data is merely given as one example. For example, when the amount of reaction liquid for a certain area is determined to be 30%, the control unit 11 turns dots of the reaction liquid for each pixel that constitutes this certain area, into the dot-on at a ratio of three pixels out of 10 pixels. Thus, it is only necessary to generate reaction-liquid record data in which dots of the reaction liquid turned into the dot-on are arranged at a ratio of three pixels out of 10 pixels and, for example, at equal intervals or substantially equal intervals. In addition, the control unit 11 may use the dithering method in the halftone processing to the amount of reaction liquid. In this case, it is only necessary to generate the reaction-liquid record data in which the arrangement of dots of the reaction liquid is more regular than the arrangement of the ink dots, by using the dither matrix having a high property of distribution and regularity of generated dots, rather than using the dither matrix used in the halftone processing to the ink-amount image data.

Figure 5:
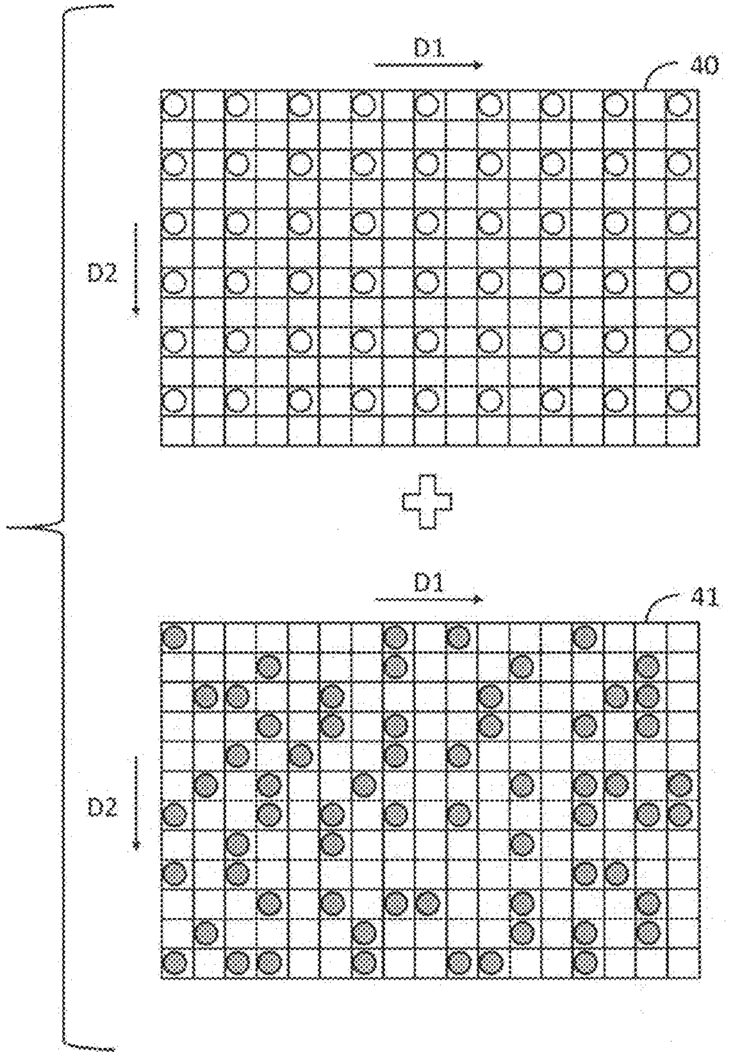
FIG. 5 is a diagram illustrating an example of reaction-liquid record data and ink record data.

FIG. 5 illustrates, as examples, reaction-liquid record data 40 generated in step S130 and ink record data 41 generated in step S120. FIG. 5 also illustrates the relationship between each of the record data 40 and 41 and the directions D1 and D2. Individual rectangles that constitute each of the record data 40 and 41 indicate individual pixels. The reaction-liquid record data 40 and the ink record data 41 are record data concerning the same region in an image represented by image data acquired in step S110, and have a relationship in which they are recorded on the medium 30 so as to overlap with each other.

Blank circles illustrated in pixels of the reaction-liquid record data 40 each indicate a dot of the reaction liquid. Circles in gray color illustrated in pixels of the ink record data 41 each indicate an ink dot. This gray color is a color used to indicate a difference from the dot of the reaction liquid, and is irrelevant to the actual color of the ink dot. As illustrated in FIG. 5 as an example, the dots of the reaction liquid are regularly arranged in the reaction-liquid record data 40, and the arrangement of the ink dot in the ink record data 41 is more irregular than the arrangement of dots of the reaction liquid in the reaction-liquid record data 40.

In step S140, the control unit 11 causes the recording unit 18 to perform recording in accordance with the generated reaction-liquid record data and the generated ink record data. The control unit 11 also controls the transport unit 17 at necessary timing to transport the medium 30 for the purpose of performing recording as described with reference, for example, to FIG. 2.

The control unit 11 selects which of the first reaction liquid and second reaction liquid is used in accordance with the medium type included in the recording condition acquired in step S100. In the present embodiment, a relationship between the medium type and the type of the reaction liquid is stored in advance in the storage 15 or the like. It is only necessary that the control unit 11 refers to this relationship to select either the first reaction liquid or the second reaction liquid in accordance with the medium type. Of the nozzle groups 22P1 and 22P2 of the first nozzle group, the control unit 11 causes the nozzle group 22 that discharges the reaction liquid selected according to the medium type, to be driven in accordance with the reaction-liquid record data. For example, when the first reaction liquid is selected in accordance with the medium type, the control unit 11 causes dots of the reaction liquid to be discharged to the medium 30 from each of the nozzles 21 of the nozzle group 22P1 in accordance with on and off of the dot of the reaction liquid in the reaction-liquid record data.

It is needless to say that, when the number of types of the reaction liquid that the printing head 20 can discharge is only one, the step of selecting the reaction liquid in accordance with the medium type is not necessary. As described above, when the amount of reaction liquid is determined for each region in a page, the control unit 11 causes the number of dots of the reaction liquid corresponding to the amount of reaction liquid for each region, to be discharged from the first nozzle group for each of the regions within a range corresponding to a page of the medium 30.

In addition to the control of driving of the first nozzle group as described above, the control unit 11 drives each of the nozzles 21 of the nozzle groups 22C, 22M, 22Y, and 22K in accordance with the ink record data. In other words, ink dots of each color of CMYK according to the ink record data are discharged from the nozzle groups 22C, 22M, 22Y, and 22K to the medium 30. As a result of step S140, a layer of the reaction liquid is formed on the medium 30, and an image representing the ink record data is formed by ink of each color so as to overlap with the formed layer. Then, the flowchart in FIG. 3 ends.

3. Roundup

In this manner, with the present embodiment, the recording device 10 includes: the first nozzle group including the plurality of nozzles 21 configured to discharge, to the medium 30, the first dot that is a dot of a reaction liquid; the second nozzle group including the plurality of nozzles 21 configured to discharge, to the medium 30 to which the reaction liquid has been discharged, the second dot that is a dot of ink containing a color material that coagulates with the reaction liquid; and the control unit 11 configured to control discharging of the first dot by the first nozzle group and discharging of the second dot by the second nozzle group. In addition, the control unit 11 controls arrangement, on the medium 30, of the first dot discharged by the first nozzle group so as to be more regular than arrangement, on the medium 30, of the second dot discharged by the second nozzle group.

With the configuration described above, the arrangement of the first dots, that is, the dots of the reaction liquid on the medium 30 is relatively regular. This also makes regular the locations where the second dots, that is, the ink dots discharged to the medium 30 coagulate due to reaction with the reaction liquid, and are fixed, as compared with a typical case in which the arrangement of the dots of the reaction liquid is irregular. In addition, this also reduces phenomena in which the ink dots coagulate and are combined at unbalanced locations due to the irregular arrangement of the dots of the reaction liquid. This enables the dot sizes of the ink fixed on the medium 30 to be relatively uniform. For these reasons, the graininess improves in an image or a region of the image with a low gray-scale to intermediate tone for which the amount of ink is relatively low, and the chroma improves due to the uniform arrangement of the ink relative to the medium surface, which makes it possible to obtain favorable image quality. Note that, in a case of an image or a region of the image with a gray-scale having a high amount of ink, a large portion of or almost all of the surface of the medium is covered with the ink dots, and hence, almost no problem arises in terms of the graininess. Thus, the present embodiment particularly provides an effect of improving the image quality of an image or a region of the image having a low gray-scale to intermediate tone as described above.

In addition, with the present embodiment, the control unit 11 determines the arrangement of the first dots using error diffusion, and determines the arrangement of the second dots using a dithering method.

With this configuration, in the halftone processing used to determine the arrangement of each of the first dot and the second dot, the error diffusion and the dithering method are separately used. This makes it possible to easily enhance the regularity of the arrangement of the first dots to be higher than the regularity of the arrangement of the second dots.

The present embodiment is not limited to the recording device or a system, and also discloses a disclosure in various categories including a recording method performed by the device or the system, and the program 12 that causes a processor to execute the method.

For example, there is the recording method performed by the recording device 10 including: the first nozzle group including the plurality of nozzles 21 configured to discharge, to the medium 30, the first dot that is a dot of the reaction liquid; and the second nozzle group including the plurality of nozzles 21 configured to discharge, to the medium 30 to which the reaction liquid has been discharged, the second dot that is a dot of ink containing a color material that coagulates with the reaction liquid, and this method includes the recording step of controlling discharging of the first dot by the first nozzle group and discharging of the second dot by the second nozzle group. In the recording step, arrangement, on the medium 30, of the first dot discharged by the first nozzle group is controlled to be more regular than arrangement, on the medium 30, of the second dot discharged by the second nozzle group.

4. First Modification Example

Modification examples included in the present embodiment will be described. For the modification example, matters common to those in the embodiment that has been already described will not be repeated as appropriate. Combinations of individual modification examples are also included in the present embodiment.

As described in connection with step S130, the control unit 11 determines the amount of reaction liquid discharged to the medium 30 in accordance with the amount of ink discharged to the medium 30. In the first modification example, when the amount of the reaction liquid discharged to the medium 30 is equal to or less than a predetermined threshold value, the control unit 11 sets the density of the arrangement of the first dots in either the vertical direction or the horizontal direction of the medium 30, to be higher than the density of the arrangement of the first dots in the other one of the vertical direction or the horizontal direction of the medium 30. Either the direction D1 or D2 may be set as the vertical direction. Here, for the purpose of convenience, the direction D2 is set as the vertical direction, and the direction D1 is set as the horizontal direction.

Figure 6A:
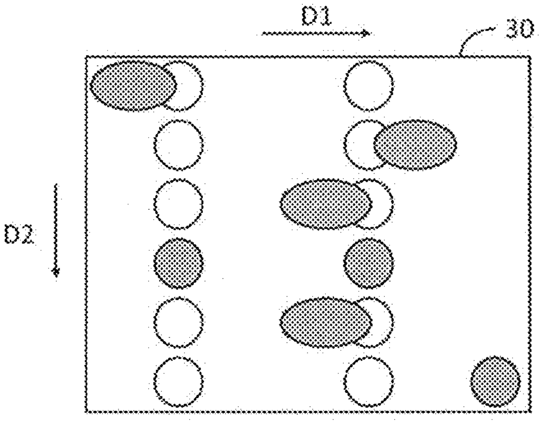
FIG. 6A is an enlarged view illustrating, as an example, a portion of a medium on which an image is recorded according to a first modification example.

FIG. 6A illustrates, in an enlarged manner, an example of a portion of the medium 30 on which an image is recorded through step S140 in the first modification example. In FIG. 6A, blank circles represent dots of the reaction liquid recorded in accordance with the reaction-liquid record data generated through step S130, and circles in gray color represent ink dots recorded in accordance with the ink record data generated through step S120. Note that the dots of the reaction liquid are almost or completely not visually recognized by a user. In FIG. 6A, the dots of the reaction liquid are arranged regularly in each of the vertical direction and the horizontal direction. In addition, in FIG. 6A, the density of the arrangement of the dots of the reaction liquid in the vertical direction is higher the density of the arrangement thereof in the horizontal direction.

When the ink dots are discharged to locations that overlap with the dots of the reaction liquid, the ink dots react with the reaction liquid, and are fixed to the medium 30 in a state of having a substantially circular shape. On the other hand, when the ink dots are discharged to locations where they are brought into contact with the dots of the reaction liquid, the ink dots are pulled to be deformed in a direction where the reaction dots exist, and are fixed on the medium 30 so as to have an elongated circle shape. In addition, when the ink dots are discharged at locations where they are not brought into contact with the dots of the reaction liquid, the ink dots are fixed on the medium 30 so as to smear in a state of having a substantially circular shape, as compared with a case where the ink dots react with the reaction liquid.

As illustrated in FIG. 6A, when the regular arrangement of the dots of the reaction liquid is dense in the vertical direction and is sparse in the horizontal direction, most of the deformation of the ink dots pulled by the dots of the reaction liquid is in the horizontal direction. Thus, in the recorded image, most of the shapes of the ink dots are a circular shape and a horizontally elongated circular shape. Note that, when the regular arrangement of the dots of the reaction liquid is dense in the horizontal direction and sparse in the vertical direction, most of the deformation of the ink dots pulled by the dots of the reaction liquid is in the vertical direction. Thus, most of the shapes of the ink dots are a circular shape and a vertically elongated circular shape.

Figure 6B:
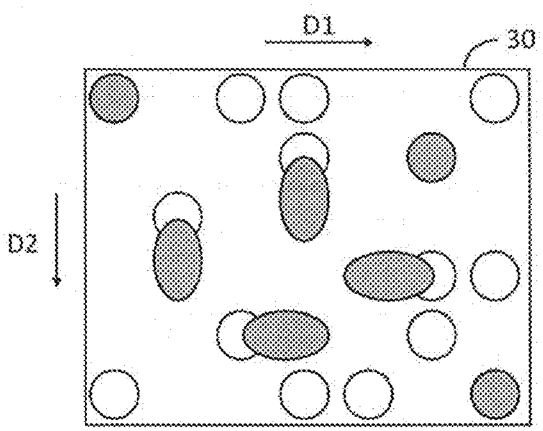
FIG. 6B is an enlarged view illustrating a portion of a medium on which an image is recorded according to a related example.

FIG. 6B illustrates a related example in connection with FIG. 6A, and also illustrates, in an enlarged manner, a portion of the medium 30. The way of viewing of FIG. 6B is the same as the way of viewing of FIG. 6A. As illustrated in FIG. 6B, the dots of the reaction liquid are arranged in an irregular manner. Thus, in the recorded image, the discharged ink dots have various shapes such as a circular shape, a horizontally elongated shape, and a vertically elongated shape. In this manner, with the first modification example, the density of the regular arrangement of the first dots in either the vertical direction or the horizontal direction of the medium 30 is higher than the density of the regular arrangement of the first dots in the other one of the vertical direction and the horizontal direction of the medium 30. This enables the shapes of the second dots on the medium 30 to be equal to each other as much as possible, which makes it possible to suppress a deterioration in the graininess.

Note that, in a case of an image or a region of the image with a gray-scale having a high amount of ink, the number of dots of the reaction liquid that is discharge is increased in accordance with the amount of ink. Thus, when the dots of the reaction liquid are arranged regularly, it is substantially difficult to arrange the dots so as to be dense in either the vertical direction or the horizontal direction and be sparse in the other one of the vertical direction and the horizontal direction. Thus, it is only when the amount of the reaction liquid discharged to the medium 30 is equal to or less than a predetermined threshold value that the dots of the reaction liquid are regularly arranged so as to be denser in either the vertical direction or the horizontal direction than in the other direction. There is no limitation as to the threshold value described above. However, it can be considered to use a predetermined amount of ink appropriate to separate the amount of ink per certain area between an image having intermediate tone and an image having high gray-scale, or to use an amount of reaction liquid corresponding to the this amount of ink and obtained on the basis of the reaction-liquid amount table T1.

5. Second Modification Example

In a second modification example, when a character is recorded on the medium 30 using ink, the control unit 11 causes the arrangement of the first dots to be denser when the size of a character is smaller. When the image data acquired through step S110 contains a character as an object, the control unit 11 records the character on the medium 30. By improving the regularity of the arrangement of the dots of the reaction liquid as in the present embodiment, misalignment of each line of a character represented by the ink dots reduces, and the quality of characters on the medium 30 improves, as compared with a typical case where the dots of the reaction liquid are irregularly arranged.

Figure 7A:
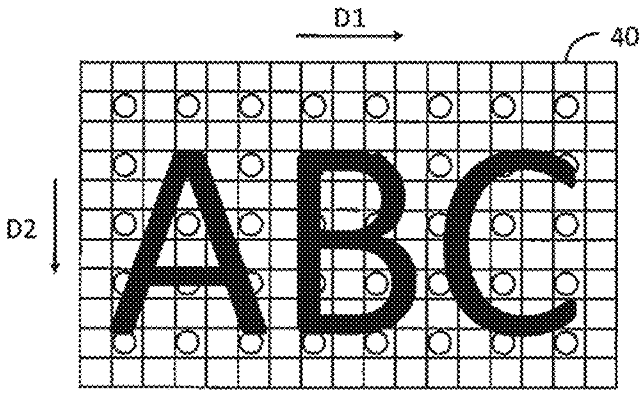
FIGS. 7A and 7B are diagrams each illustrating, as an example, a relationship between reaction-liquid record data and letters.
Figure 7B:
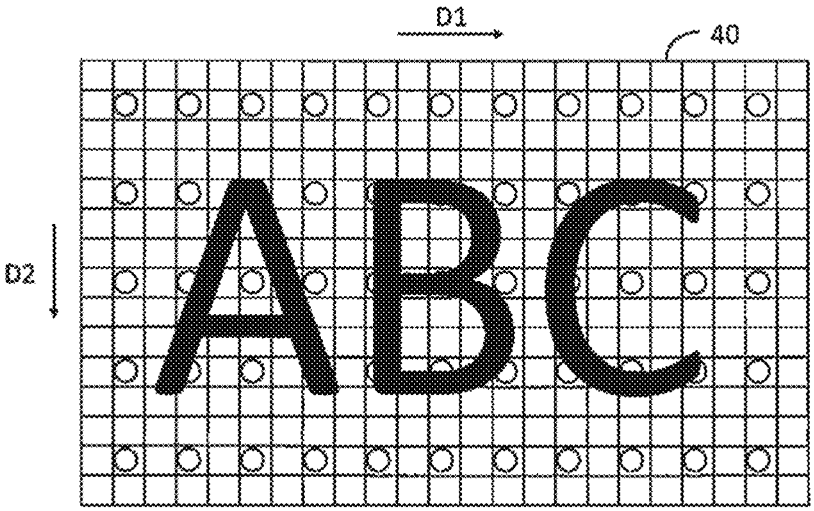

FIGS. 7A and 7B each illustrate an example of the reaction-liquid record data 40 generated through step S130 as in FIG. 5. In addition, in FIGS. 7A and 7B, the character string “ABC” is illustrated so as to overlap with the reaction-liquid record data 40. This character string is an object included in an image represented by the image data, and is recorded on the medium 30 in accordance with the ink record data generated in step S120. The character string illustrated, as an example, in FIG. 7A is smaller in the size of character than the character string illustrated, as an example, in FIG. 7B. Thus, in the second modification example, the density of the dots of the reaction liquid in the reaction-liquid record data 40 in FIG. 7A is higher than the density of the dots of the reaction liquid in the reaction-liquid record data 40 in FIG. 7B. The density of the dots of the reaction liquid represents the number of dots of the reaction liquid per a certain distance or per a certain area.

As described above, the control unit 11 determines the amount of reaction liquid for each region corresponding to an object in the image data, and is able to determine the arrangement of the dots of the reaction liquid for each region. Thus, when the character string is detected as an object from the image data, the control unit 11 determines the amount of reaction liquid for a region containing this character string, and is able to apply the second modification example at the time of determining the arrangement of the dots of the reaction liquid. With such a second modification example, as the size of a character reduces, the regular arrangement of the dots of the reaction liquid is made denser. This makes it possible to keep the number of dots of the reaction liquid per character so as to be almost equal regardless of the size of the character, and it is possible to improve the quality of characters on the medium 30 regardless of the size of the characters.

What is claimed is:

1. A recording device comprising:

a first nozzle group including a plurality of nozzles configured to discharge, to a medium, first dots that are dots of a reaction liquid;

a second nozzle group including a plurality of nozzles configured to discharge, to the medium to which the reaction liquid is discharged, second dots that are dots of ink containing a color material that coagulates with the reaction liquid; and a control unit configured to control discharging of the first dots by the first nozzle group and discharging of the second dots by the second nozzle group, wherein the control unit controls arrangement, on the medium, of the first dots discharged by the first nozzle group so as to be more regular than arrangement, on the medium, of the second dots discharged by the second nozzle group, and the control unit further controls the arrangement of the first dots on the medium such that all distances between adjacent first dots among the first dots in one direction are equal, and the one direction is one of a first direction of the medium and a second direction of the medium which is perpendicular to the first direction.

2. The recording device according to claim 1, wherein the control unit determines the arrangement of the first dots using error diffusion, and determines the arrangement of the second dots using a dithering method.

3. The recording device according to claim 1, wherein the control unit determines an amount of the reaction liquid discharged to the medium, in accordance with an amount of the ink discharged to the medium, and when the amount of the reaction liquid discharged to the medium is equal to or less than a predetermined threshold value, the control unit sets a density of the arrangement of the first dots in either the first direction or the second direction of the medium, to be higher than a density of arrangement of the first dots in the other one of the first direction or the second direction of the medium, the first direction is a vertical direction of the medium, and the second direction is a horizontal direction of the medium.

4. The recording device according to claim 1, wherein when a character is recorded on the medium using the ink, the control unit causes the arrangement of the first dots to be denser when a size of the character is smaller.

5. The recording device according to claim 1, wherein the control unit further controls the arrangement of the first dots on the medium such that all distances between adjacent first dots among the first dots in the other direction of the first direction and the second direction are equal.

* * * * *